(12) United States Patent
Broman

(10) Patent No.: US 9,822,709 B2
(45) Date of Patent: Nov. 21, 2017

(54) PNEUMATIC CONTROL VALVE

(71) Applicant: PHD, Inc., Fort Wayne, IN (US)

(72) Inventor: Nelson Broman, Bluffton, IN (US)

(73) Assignee: PHD, Inc., Fort Wayne, IN (US)

( * ) Notice: Subject to any disclaimer, the term of this patent is extended or adjusted under 35 U.S.C. 154(b) by 328 days.

(21) Appl. No.: 14/511,496

(22) Filed: Oct. 10, 2014

(65) Prior Publication Data
US 2015/0107263 A1   Apr. 23, 2015

Related U.S. Application Data

(60) Provisional application No. 61/892,761, filed on Oct. 18, 2013.

(51) Int. Cl.
| | |
|---|---|
| *F02C 7/00* | (2006.01) |
| *F02C 7/277* | (2006.01) |
| *F16K 5/06* | (2006.01) |
| *F16K 31/122* | (2006.01) |
| *F16K 31/528* | (2006.01) |
| *F01D 9/00* | (2006.01) |

(52) U.S. Cl.
CPC ............... *F02C 7/277* (2013.01); *F01D 9/00* (2013.01); *F16K 5/0647* (2013.01); *F16K 31/1221* (2013.01); *F16K 31/528* (2013.01); *F16K 31/5284* (2013.01); *F16K 31/5286* (2013.01); *F16K 31/5288* (2013.01); *F05D 2260/85* (2013.01)

(58) Field of Classification Search
CPC .. F01D 19/00; F05D 2260/85; F16K 31/5284; F16K 31/528; F16K 31/5282; F16K 31/5286; F16K 31/5288
See application file for complete search history.

(56) References Cited

U.S. PATENT DOCUMENTS

| | | | | |
|---|---|---|---|---|
| 2,975,976 A | * | 3/1961 | Smith | ............... G05D 16/2093 137/506 |
| 3,515,371 A | * | 6/1970 | Jones, Jr. | ............... F16K 5/204 251/214 |
| 4,350,322 A | * | 9/1982 | Mueller | ............... F16K 31/502 137/556 |
| 4,602,762 A | * | 7/1986 | Koch | ............... F16K 5/0673 251/172 |

(Continued)

FOREIGN PATENT DOCUMENTS

| | | |
|---|---|---|
| DE | 1 950 917 | 12/1966 |
| DE | 33 03 872 A1 | 8/1984 |

(Continued)

OTHER PUBLICATIONS

European Communication dated Apr. 13, 2015 for European Patent Application No. EP 14 18 9133 (7 pages).

*Primary Examiner* — Gerald L Sung
*Assistant Examiner* — Katheryn Malatek
(74) *Attorney, Agent, or Firm* — Taylor IP, P.C.

(57) ABSTRACT

A control valve for a gas turbine engine air starter. The control valve includes a spherical or ball valve element rotatable between a closed position and an open position to connect an internal flow passage to the air starter. A series of camming elements interconnecting a piston and a valve stem for the spherical valve element convert linear displacement of the piston into rotational movement of the valve for rapid opening.

14 Claims, 4 Drawing Sheets

(56) References Cited

U.S. PATENT DOCUMENTS

| | | | |
|---|---|---|---|
| 5,285,626 A | | 2/1994 | Leeson |
| 6,793,194 B1 | * | 9/2004 | Grinberg .............. F15B 15/068 |
| | | | 251/263 |
| 2003/0222234 A1 | * | 12/2003 | Filkovski ............ F16K 31/1221 |
| | | | 251/30.01 |
| 2006/0260323 A1 | * | 11/2006 | Moulebhar ........... F01D 21/003 |
| | | | 60/793 |
| 2013/0031912 A1 | * | 2/2013 | Finney ................... F01D 19/00 |
| | | | 60/778 |

FOREIGN PATENT DOCUMENTS

| | | | | |
|---|---|---|---|---|
| DE | 33 15 244 A1 | | 10/1984 | |
| FR | 1409492 | | 8/1965 | |
| GB | 1077281 A | * | 7/1967 | ......... F16K 31/1635 |

\* cited by examiner

PNEUMATIC CONTROL VALVE

CROSS REFERENCE TO RELATED APPLICATIONS

This is a non-provisional application based upon U.S. provisional patent application Ser. No. 61/892,761, entitled "PNEUMATIC CONTROL VALVE", filed Oct. 18, 2013, which is incorporated herein by reference.

BACKGROUND OF THE INVENTION

1. Field of the Invention

The present invention relates to pneumatic control valves, and, more particularly, to valves for directing motive fluid.

2. Description of the Related Art

Pneumatic control valves are mechanical devices used to provide directional control of pressurized air wherein the pressure and/or the velocity of the air is used as a motive force.

Pneumatic control valves are characterized by an electric motor or pneumatically driven piston coupled slidably or rotationally to a valve subassembly. As the motor or piston causes valve subassembly components to slide or rotate, internal air passageways are opened, closed or connected to other passageways such that pressurized air supplied to the control valve is blocked, passed thru or directed to one of multiple outlet passageways.

One use of a pneumatic control valve is to control flow of air to a turbine starter on a gas turbine or jet engine. In such a usage, when the airflow is allowed to pass thru the control valve, it causes the turbine starter to rotate. The turbine starter, in turn, is directly coupled to the jet engine and provides initial rotation of the jet engine during the start sequence. In the prior art, the pneumatic control valve may have included a flat round butterfly style shutter in the air passageway that would rotate perpendicular to the passageway axis to close and block the passage or rotate to a position parallel to the air passageway axis to open and to allow air to pass thru.

In this prior art, the butterfly valve shutter is always in the middle of the air passageway whether it is open or closed. Due to its location in the middle of the air passageway, the butterfly shutter can impede the free flow of air and result in flow turbulence or losses in pressure and flow velocity due to the obstruction of the air passageway by the butterfly shutter.

What is needed in the art therefore, is a fluid control valve for motive fluid that offers minimal restriction to flow in the open position.

SUMMARY OF THE INVENTION

The present invention is directed to an improved control valve incorporating a valve mechanism that reduces the turbulence and losses in velocity and pressure by providing an air flow path with no obstructions.

In one form, the present invention includes a control valve for fluid flow. The valve has a valve body with an inlet and aligned outlet passage and interconnecting chamber. A valve element is positioned within the chamber and has a through flow passage with the valve element being rotatable about an axis between a first position in which the valve element blocks flow between the inlet and outlet passages and a second position in which the through flow passage aligns with and connects with the inlet and outlet passages in the valve body. A stem extends from the valve body and is coaxial with the valve element axis. A housing receives the stem and a piston is displaceable within the housing in a direction parallel to the axis of the stem with the housing piston and stem having inter-engaging camming elements for converting the linear displacement of the piston along stem axis to a rotation of the stem in the valve body between the first and second positions.

In another form, the invention includes a gas turbine engine rotated into starting by an air turbine starter and a control valve for controlling pressurized air delivered to the starter. The control valve includes a valve body having an aligned inlet passage and an aligned outlet passage and an interconnecting chamber. A valve element is positioned within the chamber and has a through flow passage. The valve element is rotatable about an axis between a first position in which the valve element blocks flow between the inlet and outlet passages and a second position in which the through flow passage aligns with and connects the inlet and outlet passages in the valve body. A stem extends from the valve body and is coaxial with the valve body axis. A housing receives the stem and has a piston displaceable within the housing in a direction parallel to the axis of the stem. The housing piston and stem have inter-engaging camming elements for converting the linear displacement of the piston along its axis to rotation of the stem and valve body between the first and second positions.

In another form, the invention is characterized by a ball with a through flow passage affixed between two seats which act as seals. Both the seats and ball are affixed in a housing which provides an inlet and outlet flow path axially in line with the ball seats. When the axis of the through flow passage in the ball is rotated to a position axially aligned with the seats and the housing inlet and outlet flow path air is allowed to flow through the mechanism from the inlet through the ball and out the outlet. When the axis of the through flow passage in the ball is rotated perpendicular to the axis of the inlet and outlet in the housing, the flow path is blocked and air does not pass from the inlet to the outlet of the housing.

The present invention provides a pneumatic cylinder with a piston that rotates as it reciprocates to provide the motive rotary force for rotating a valve between open and closed positions.

The present invention also provides a fluid control valve with minimum resistance to flow when the valve is open.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one embodiment of the invention and such exemplifications is not to be construed as limiting the scope of the invention in any manner.

DETAILED DESCRIPTION OF THE INVENTION

Figure 1:
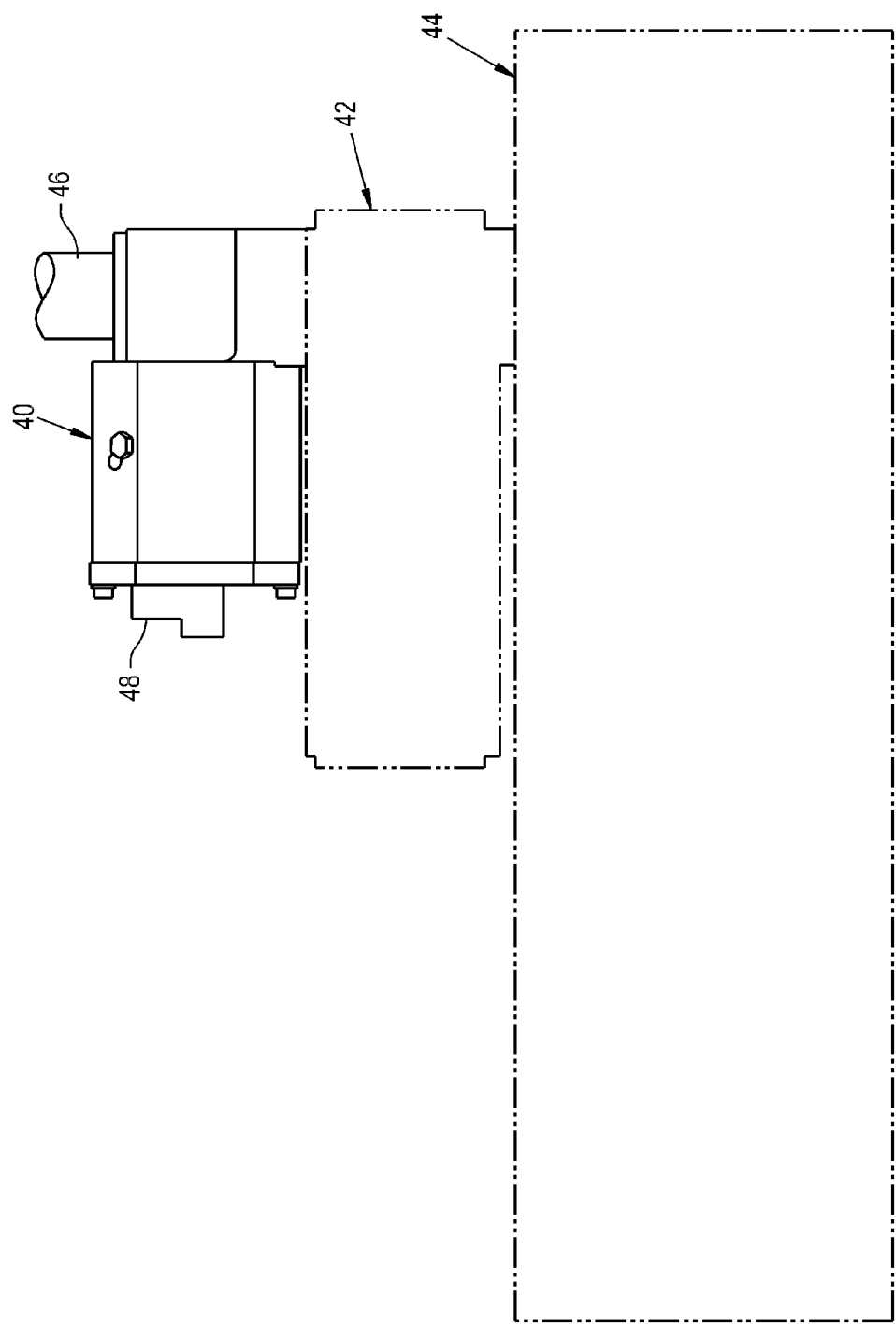
FIG. 1 Shows a system level view of a valve embodying the present invention on a turbine engine starter.

Referring now to FIG. 1, a control valve 40, in one embodiment, is attached to a turbine starter 42 which, in turn, is attached to a jet engine 44 to provide initial rotation for starting of the engine. Starter 42 is usually a centripetal turbine (not shown) driven into rotation by pressurized air from conduit 46 and controlled by valve 40. The turbine is connected to the rotor of the jet engine 44 by appropriate speed reducing gearing. Details of the starter and interconnecting gearing are not shown to enable a greater focus on the present invention. The pressurized air provided in conduit 46 can reach levels of 100 to 150 PSI.

Figure 2:
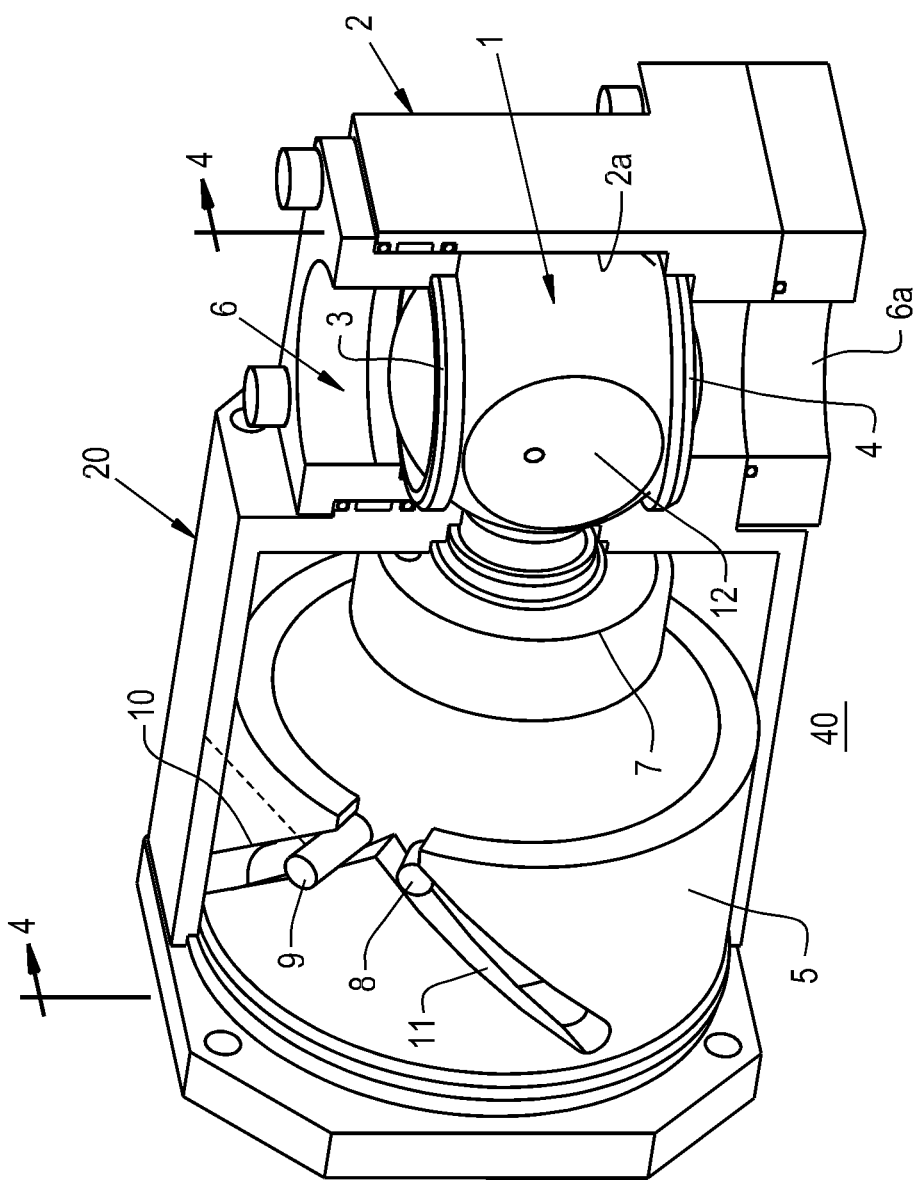
FIG. 2 is an isometric cutaway view showing the valve closed.

Referring now to FIG. 2, there is shown a cutaway view of one embodiment of a control valve 40 with a valve element in a spherical form, illustrated as a valve ball 1, in the closed position with a through flow passage 12 perpendicular to the axis of an inlet passage 6 and an actuating piston 5 shown in a retracted position. The ball 1 is positioned in a chamber 2a between two annular ball seats 3 and 4, which are in turn affixed in a valve body 2. The annular ball seats 3 and 4 provide both a bearing surface such that the ball 1 can rotate freely and a sealing surface such that when compressed air is supplied to the inlet passage 6 from conduit 46, the air does not leak past the ball seat 3 and the closed ball 1.

Figure 3:
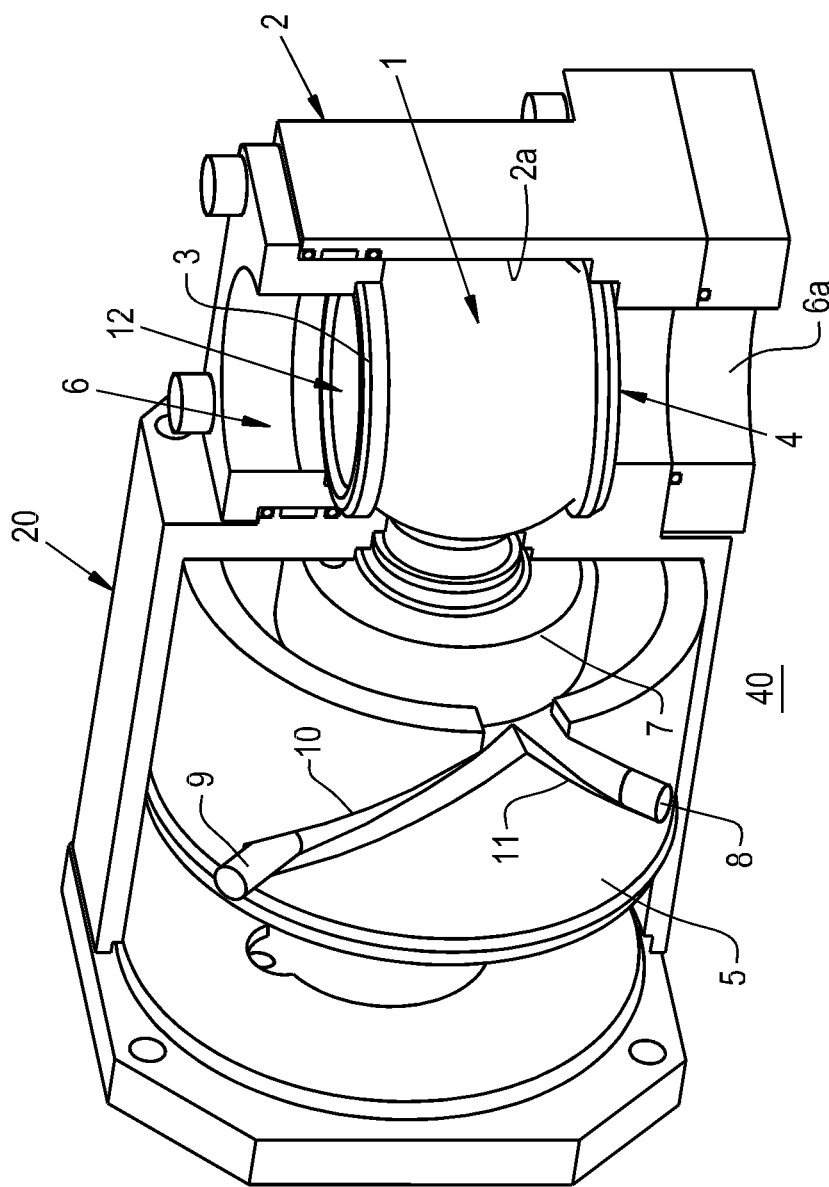
FIG. 3 is an isometric cutaway view showing the valve open.

The ball 1 is coupled directly to a ball driver or stem 7 which is positioned rotatably in a housing 20. The stem 7 has multiple drive pins 8 affixed in its outer diametric surface, only one of which is shown. The piston 5 is positioned in the housing 20 and is able to rotate and be displaced linearly by multiple spiral grooves or slots 10 in the piston 5 and multiple pins 9 affixed in the housing 20. In FIGS. 2 and 3, the housing 20 is cut away in the area where one of the pins 9 is affixed in order to better show the interior components. The pin 9 is shown in its entirety without the surrounding housing 20 to which it is affixed. A dashed line 21 from pin 9 to housing 20 shows the mechanical interconnection. As the piston 5 is displaced towards the valve ball 1, the spiral grooves 10 and the pins 9 cause the piston 5 to rotate. The stem 7 is positioned rotatably inside the piston 5 and fixed slidably by the pins 8 and the spiral grooves 11 in the piston 5. As the piston 5 extends and rotates, the spiral grooves 11 and the pins 8 cause the ball driver 7 to rotate, which in turn rotates the ball 1 to the open position with the thru flow passage 12 parallel to the axis of the inlet passage 6 and an outlet passage 6a.

Referring now to FIG. 3, there is shown a cutaway view of the same embodiment of a control valve with the valve ball 1 shown in the open position and the piston 5 shown in the extended position. Starting from this position, as the piston 5 retracts away from the valve ball 1, the pins 9 and the spiral grooves 10 cause it to rotate back to the position shown in FIG. 2. As the piston 5 retracts and rotates back, the ball driver 7 is caused to rotate by the pins 8 and the spiral grooves 11 and in turn rotates the valve ball 1 back to the closed position with the thru flow passage 12 perpendicular to the axis of the inlet passage 6 as shown in FIG. 2

In another embodiment, one or the other of the grooves 10 or the grooves 11 may be parallel to the axis of the piston and still maintain rotary motion of the piston 5 by means of the other groves which remain spiraled.

Figure 4:
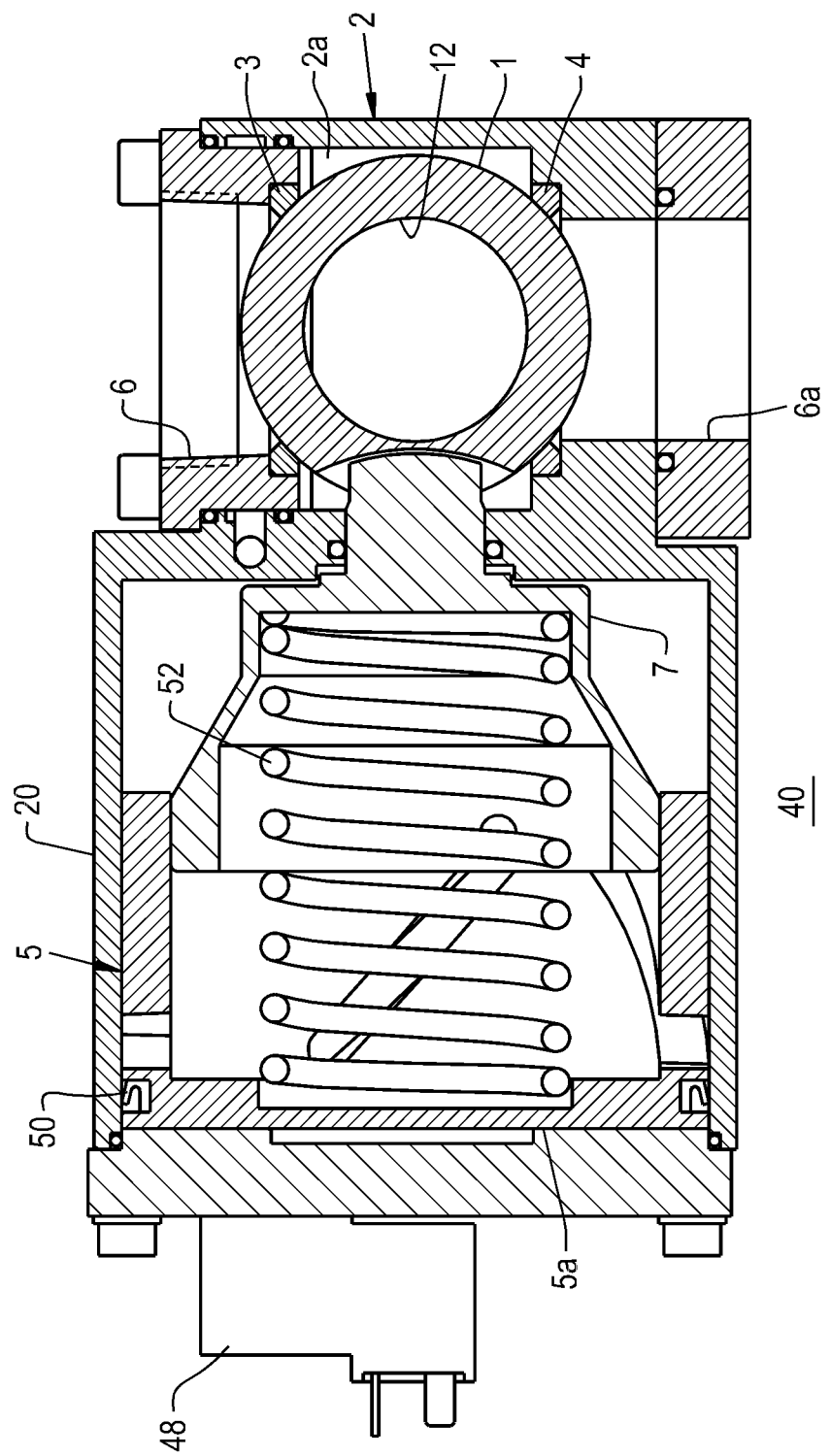
FIG. 4 is a cross section view of the valve of FIGS. 2 and 3 taken on lines 4-4 of FIG. 2.

As shown in FIG. 4, the piston 5 is displaced within housing 20 from its illustrated position by pressurizing the axial face 5a of piston 5. A control valve 48 receives pressurized air from an appropriate source (not shown) and selectively allows it to urge piston 5 to the right and place control valve 40 in the open position of FIG. 3. A one way annular seal 50 adjacent axial face 5a retains pressurized air within housing 20 during this condition. A return spring 52 acts on the interior of stem 7 and the interior wall of axial face 5a to urge piston 5 to the position of FIG. 2 when control valve 48 closes and pressure within housing 20 is at a level providing less force to open the valve 40 than the force spring 52 applies to close the valve 40.

Alternatively, a two-way seal can be provided adjacent axial face 5a, and the control valve 48 and flow passages can be configured to enable displacement of piston 5 between its two positions.

In another embodiment, an acme screw can be affixed to the piston 5 and the housing 2 to cause the piston to rotate as it extends and retracts. The control valve disclosed provides a highly compact and effective way to deliver pressurized air or fluid for motive purposes. The through flow passage between the inlet and outlet offer substantially minimal restriction to airflow in the open position. In addition the valve provides a rapid opening of the flow passage to provide faster supply of pressurized air to a starter for motive purposes. The camming elements in the housing provide a mechanism in which the linear displacement of the piston is converted to rotational movement in an amplified manner, using the rotation of the piston as it is displaced linearly to drive the valve stem into rotation. This results in an extremely compact valve providing the necessary speed of opening for rapid delivery of motive fluid.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A control valve for fluid flow, said control valve comprising:
    a valve body having an inlet passage and an aligned outlet passage, and an interconnecting chamber;
    a valve element positioned within said interconnecting chamber and having a through flow passage, said valve element being rotatable about a valve body axis between an open position in which the through flow passage aligns with and connects said inlet and outlet passages in said valve body and a closed position in which said valve element blocks flow between said inlet and outlet passages;
    a stem extending from said valve body coaxial with said valve body axis;
    a housing receiving said stem; and
    a piston displaceable within said housing in a direction parallel to an axis of said stem, said housing, said piston and said stem having inter-engaging camming elements for connecting the linear displacement of said piston along said valve body axis into rotation of said stem and said valve element between said open and closed positions, wherein said housing has at least one pin extending inward and said piston has a first slot receiving said at least one housing pin, and said stem has at least one stem pin extending outward from said stem and said piston has a second slot receiving said at least one stem pin for rotating said stem as said piston is displaced in said direction parallel to the axis of said stem, wherein said first and second slots each form a spiral configuration and converge at a common point.

2. The control valve as claimed in claim 1, wherein the valve element is spherical and the through flow passage extends through an axis of rotation of the valve element.

3. The control valve as claimed in claim 2, further comprising annular seats providing sealing surfaces between the valve body and the spherical valve element.

4. The control valve as claimed in claim 1, further comprising a source of pressurized control air and a valve selectively operable to apply pressurized air to said piston to displace the piston toward the open position of said valve element.

5. The control valve as claimed in claim 4, further comprising a spring positioned within said housing and displaceable to urge the piston to the closed position of said valve element.

6. The control valve as claimed in claim 5, wherein said piston has a seal positioned around the piston's periphery for permitting one way sealing of air pressure.

7. The control valve as claimed in claim 5, wherein said stem is positioned rotatably inside said piston and said spring acts between said stem and the interior of said piston.

8. A gas turbine power plant comprising:
a gas turbine engine;
a pneumatic starter mechanically connected to said gas turbine engine to drive said gas turbine engine into rotation;
a source of pressurized fluid; and,
a control valve for selectively connecting the pressurized fluid to said pneumatic starter, said control valve comprising a valve body having an inlet passage and aligned outlet passage and an interconnecting chamber, a valve element being positioned within the interconnecting chamber and having a through flow passage and rotatable about a valve body axis between an open position in which the through flow passage aligns with and connects the inlet and outlet passages in the valve body and a closed position in which the valve element blocks flow between the inlet and outlet passages, a rotatable stem extending from the valve body and coaxial with the valve body axis, said control valve including a housing receiving the rotatable stem and a piston displaceable within the housing in a direction parallel to an axis of the rotatable stem, the housing, the piston and the rotatable stem having inter-engaging camming elements for converting the linear displacement of the piston along said valve body axis into rotation of said rotatable stem and valve element between the closed and open positions, wherein said housing has at least one pin extending inward and said piston has a first slot receiving said at least one housing pin, and said rotatable stem has at least one pin extending outward and said piston has a second slot receiving said at least one stem pin for rotating said rotatable stem as said piston is displaced in said direction parallel to the axis of said rotatable stem, wherein said first and second slots each form a spiral configuration and converge at a common point.

9. The gas turbine engine as claimed in claim 8, wherein the valve element is spherical and said through flow passage extends through an axis of rotation of the spherical valve element.

10. The gas turbine engine as claimed in claim 9, further comprising annular rings within said valve body for sealing said spherical valve element.

11. The gas turbine engine as claimed in claim 8, further comprising a source of pressurized air and a second control valve to selectively apply pressurized air to displace said piston towards the open position of said valve element.

12. The gas turbine engine as claimed in claim 11, further comprising a spring positioned within said housing and urging said piston to the closed position for said valve element.

13. The gas turbine engine as claimed in claim 12, further comprising a seal on said piston for sealing flow so as to facilitate displacement of said piston to the open position of the valve element.

14. The control valve as claimed in claim 12, wherein said rotatable stem is positioned rotatably inside said piston and said spring acts between said rotatable stem and the interior of said piston.

* * * * *